United States Patent [19]

Wiegand

[11] Patent Number: 5,396,691
[45] Date of Patent: Mar. 14, 1995

[54] METHOD OF JOINING WEATHER STRIPPING

[75] Inventor: Richard L. Wiegand, Dayton, Ohio

[73] Assignee: The Dayton Tool Co., Inc., Dayton, Ohio

[21] Appl. No.: 255,745

[22] Filed: Jun. 7, 1994

Related U.S. Application Data

[62] Division of Ser. No. 102,061, Aug. 4, 1993.

[51] Int. Cl.6 .............................................. B23P 11/00
[52] U.S. Cl. ..................................... 29/432.1; 29/513; 29/525.1; 403/283
[58] Field of Search ...................... 29/432, 432.1, 513, 29/525.1; 403/274, 278, 281, 283, 405.1, 408.1

[56] References Cited

U.S. PATENT DOCUMENTS

| 190,420 | 5/1877 | Davis . | |
| 379,688 | 3/1888 | Dennis . | |
| 1,168,657 | 1/1916 | Lorraine | 403/283 |
| 1,245,099 | 10/1917 | Gross et al. . | |
| 2,013,217 | 9/1935 | Olmstead | 29/432 |
| 2,025,813 | 12/1935 | Frank . | |
| 2,986,793 | 6/1961 | Bright . | |
| 3,191,243 | 6/1965 | Fernberg et al. | 403/281 |
| 3,507,266 | 4/1970 | Vonasch . | |
| 3,927,493 | 12/1975 | Tsuneishi et al. . | |
| 3,974,619 | 8/1976 | Turner . | |
| 4,432,166 | 2/1984 | Weimar . | |
| 4,653,242 | 3/1987 | Ezard . | |
| 4,737,060 | 4/1988 | Birckhead | 403/405.1 |
| 5,243,747 | 9/1993 | Mesnel et al. | 29/235 |

Primary Examiner—Mark Rosenbaum
Assistant Examiner—David P. Bryant
Attorney, Agent, or Firm—Biebel & French

[57] ABSTRACT

A clip for joining end pieces of weather stripping in abutting relationship to form a continuous loop. The clip forms around an attachment portion of the weather stripping such that it does not interfere with the use of weather stripping in sealing. A pair of barbs hold the two pieces of weather stripping in abutment.

3 Claims, 7 Drawing Sheets

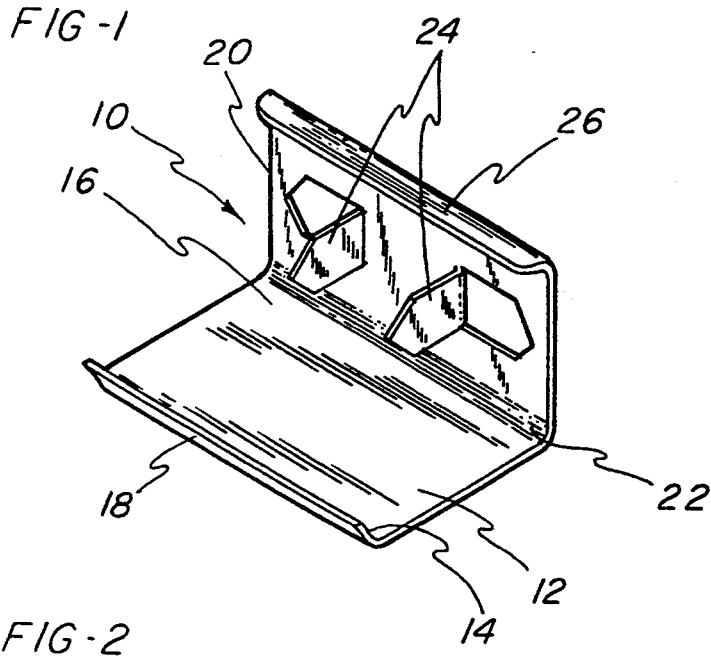
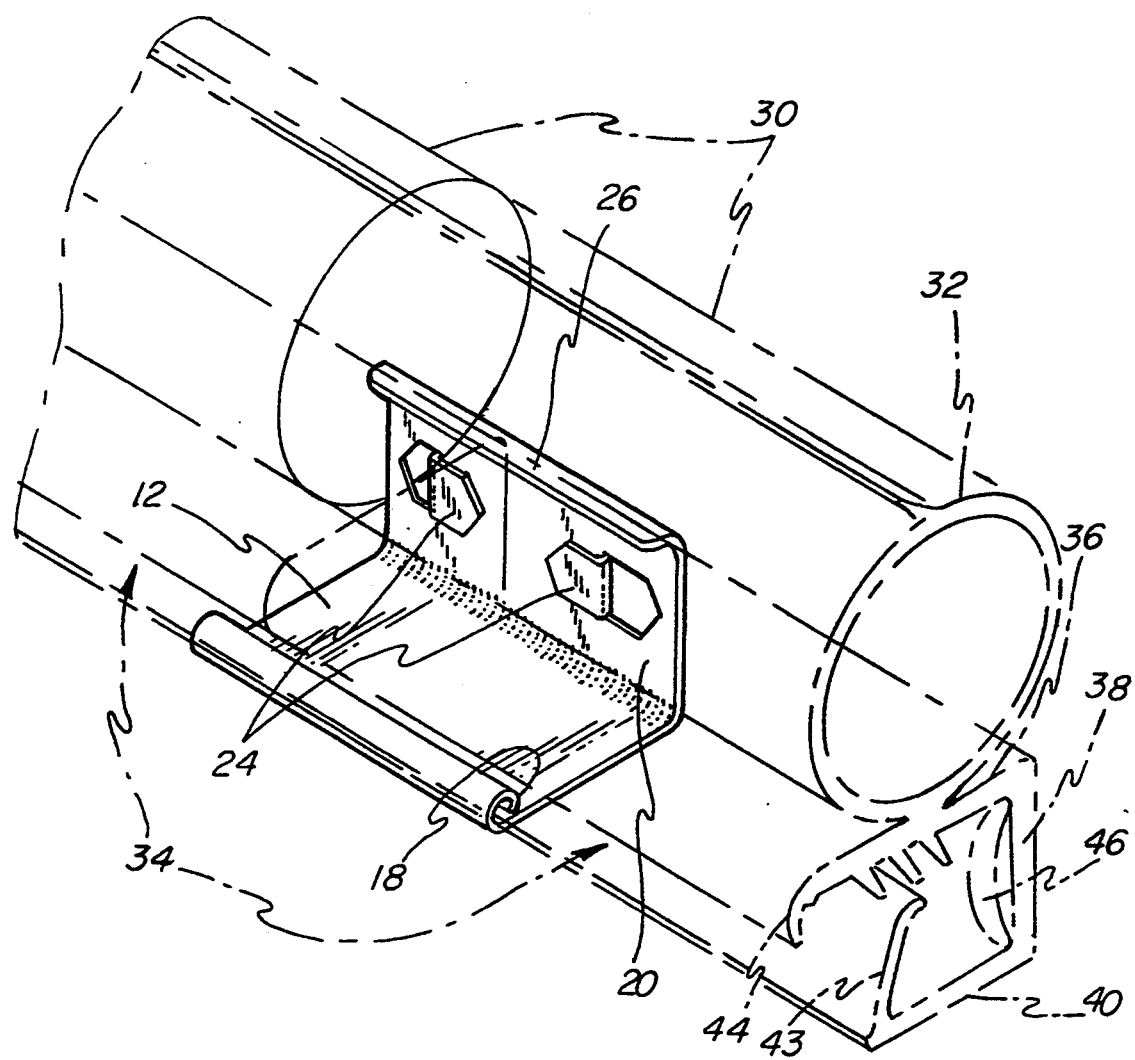

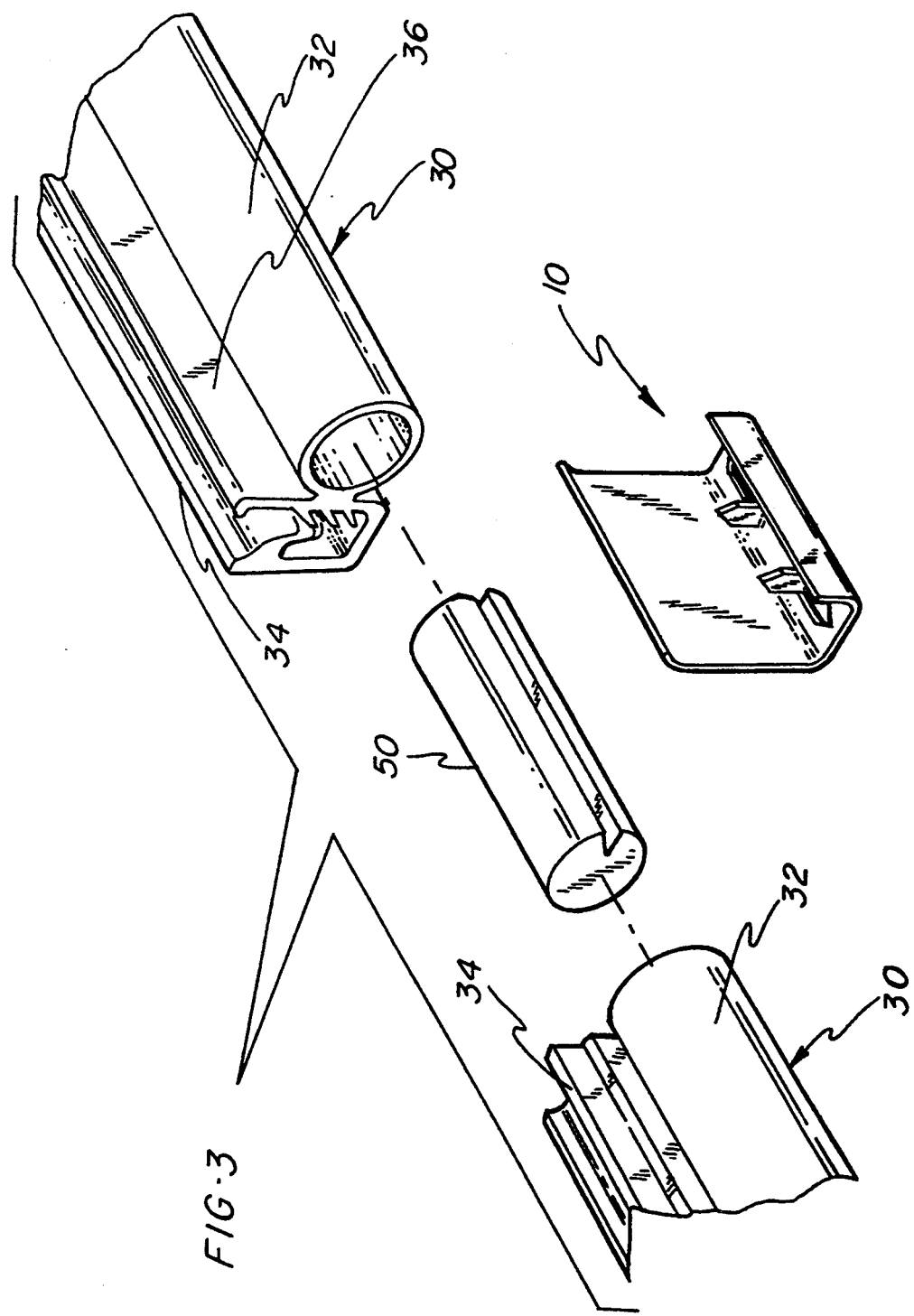

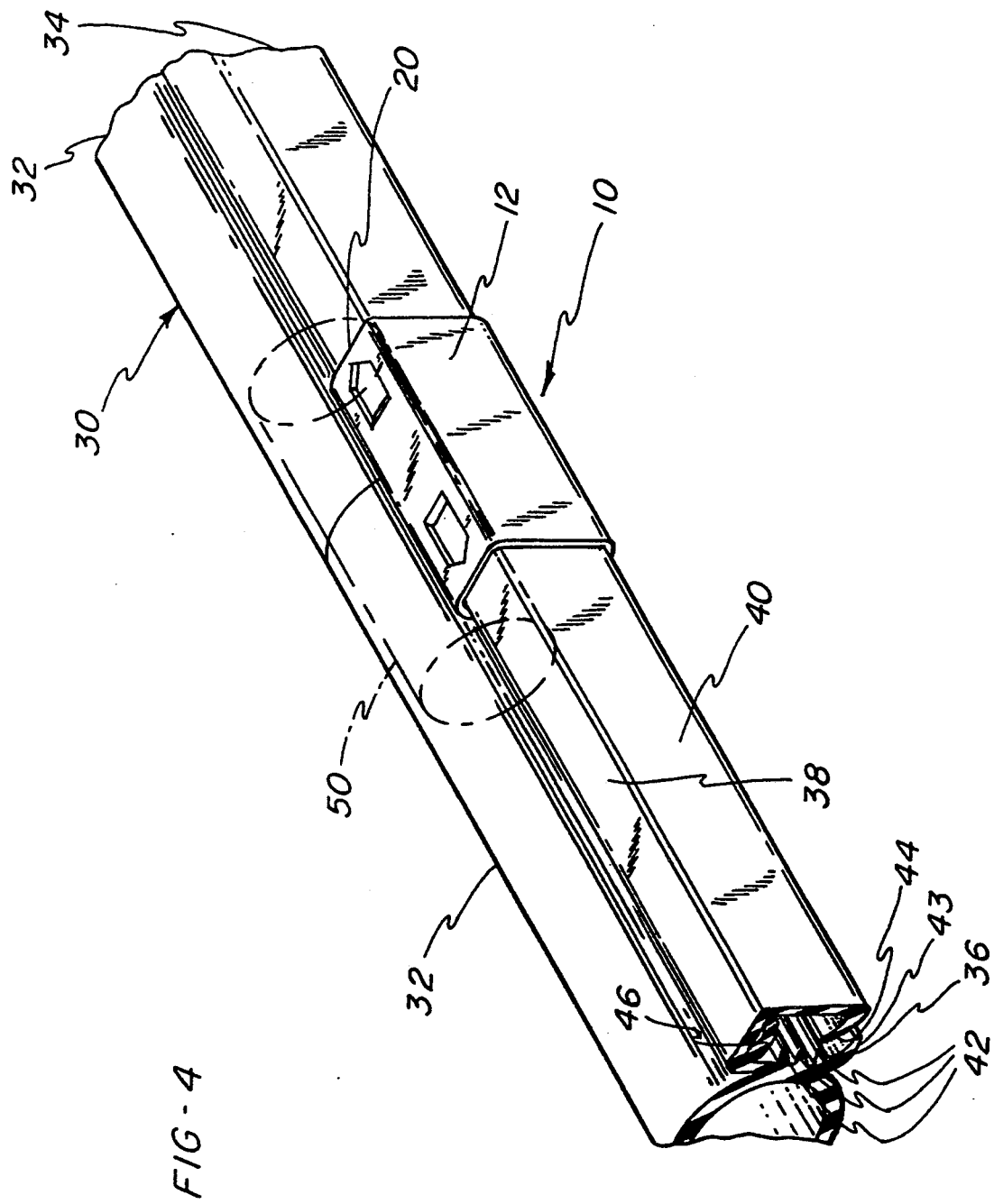

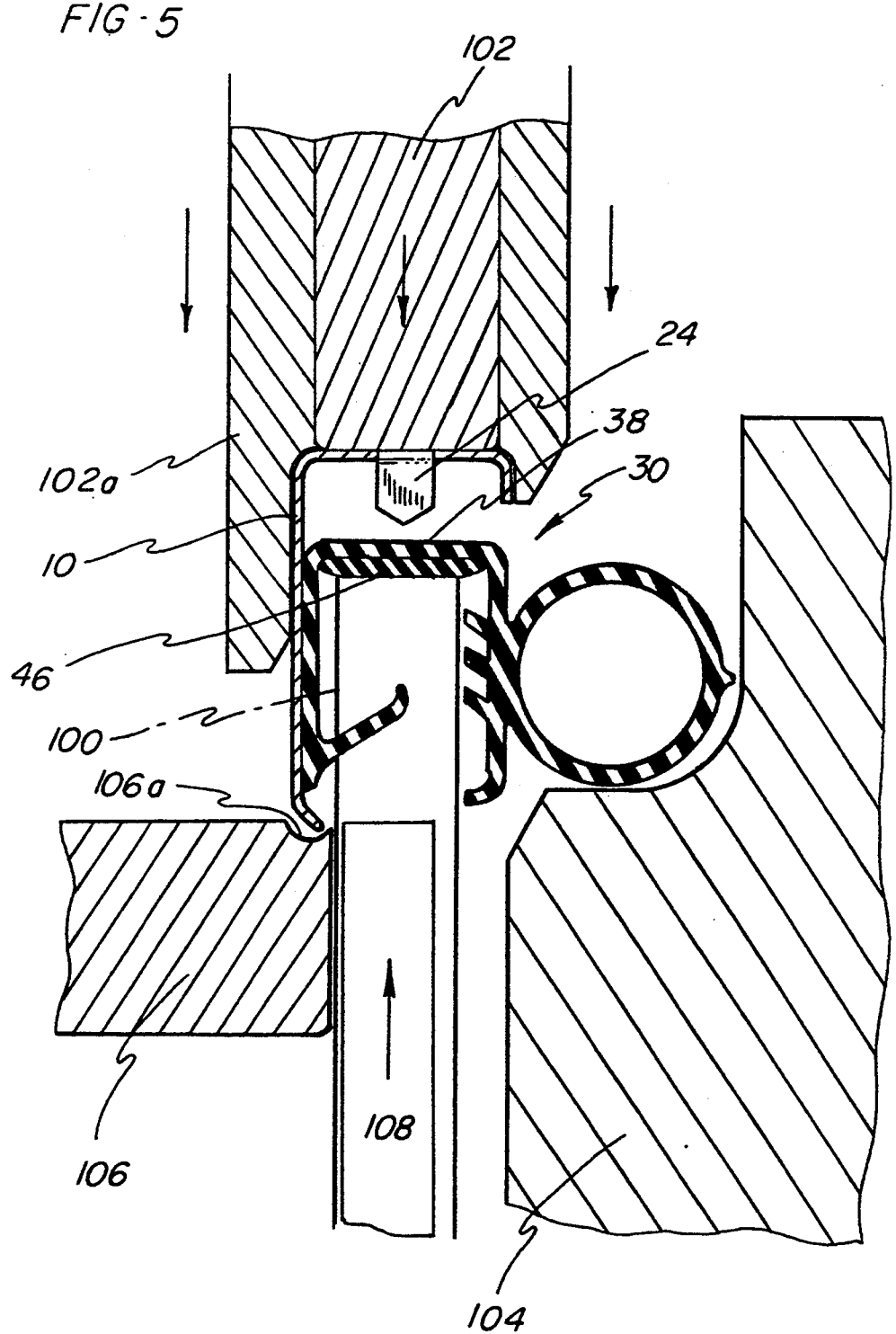

METHOD OF JOINING WEATHER STRIPPING

CROSS-REFERENCE TO RELATED APPLICATION

This application is a division of Ser. No. 08/102,061, filed Aug. 4, 1993.

BACKGROUND OF THE INVENTION

This invention relates to weather stripping joints and more specifically to the production of a continuous loop of automotive weather stripping by joining two ends thereof.

Weather stripping has been used on automobiles for the various seals around the doors, windows and trunks. Generally, the weather stripping needs to be formed in a continuous loop in order to seal the body part of the automobile, such as a door or trunk. This loop has a joint where the two ends of the weather stripping meet.

In the past the ends of a loop of automotive weather stripping have been joined by application of an adhesive. The process employed a sealing plug for connecting the two ends of the weather stripping in an aligned relationship. After alignment on the sealing plug, the two ends were adhered in place and cured. This was a time-consuming process. Furthermore, the weather stripping occupied costly production floor space during the curing of the adhesive. Also, problems were encountered with misaligned joints caused by movement of the weather stripping during the curing time.

Therefore, there is a need to provide an improved method and apparatus for end-to-end joining of automotive weather stripping.

SUMMARY OF THE INVENTION

The present invention provides a clip for joining weather stripping so as to form a closed loop. The weather stripping which is so formed has a sealing portion for sealing an access opening and an attachment portion for attaching the weather stripping to an automobile frame. Both portions are formed from rubber with the attachment portion being reinforced with wipe and polyester ply.

The clip for joining the weather stripping has a generally planar base which is provided with a forward margin and a rearward margin. An upstanding lip is joined to the base at the forward margin. A lower margin of an upstanding riser is attached to the rear margin of the base. A ledge protrudes forwardly from an upper margin of the riser. The weather stripping is held in the clip by the base, lip, riser and ledge. Barbs struck out from the riser hold the two ends of the weather stripping together.

The two ends of the weather stripping may be maintained in alignment during the clipping operation by pulling the exposed ends of the sealing portion over a sealing connector. The sealing connector remains in the weather stripping and enhances the sealing action at the joint.

Therefore, it is an object of the present invention to provide improved means for joining the two ends which will join two pieces of a length of weather stripping so as to form a closed loop.

Another object of the present invention is to provide an improved method of joining the ends of a length of weather stripping.

It is yet another object of the present invention to provide an improved weather stripping joint.

Other objects and advantages of the present invention will be apparent from the following description, the accompanying drawings and the appended claims.

BRIEF DESCRIPTION OF THE DRAWINGS

FIG. 1 shows the weather stripping clip of the present invention.

FIG. 2 shows the weather stripping clip crimped onto two ends of weather stripping shown in phantom.

FIG. 3 is an exploded view of the two ends of weather stripping, the clip and a sealing connector.

FIG. 4 shows the weather stripping clip joining two ends of weather stripping with a sealing connector shown in phantom.

FIG. 5 is a side cross-sectional view of the clip as it is seated in a fastening tool.

DESCRIPTION OF THE INVENTION

Figure 6:
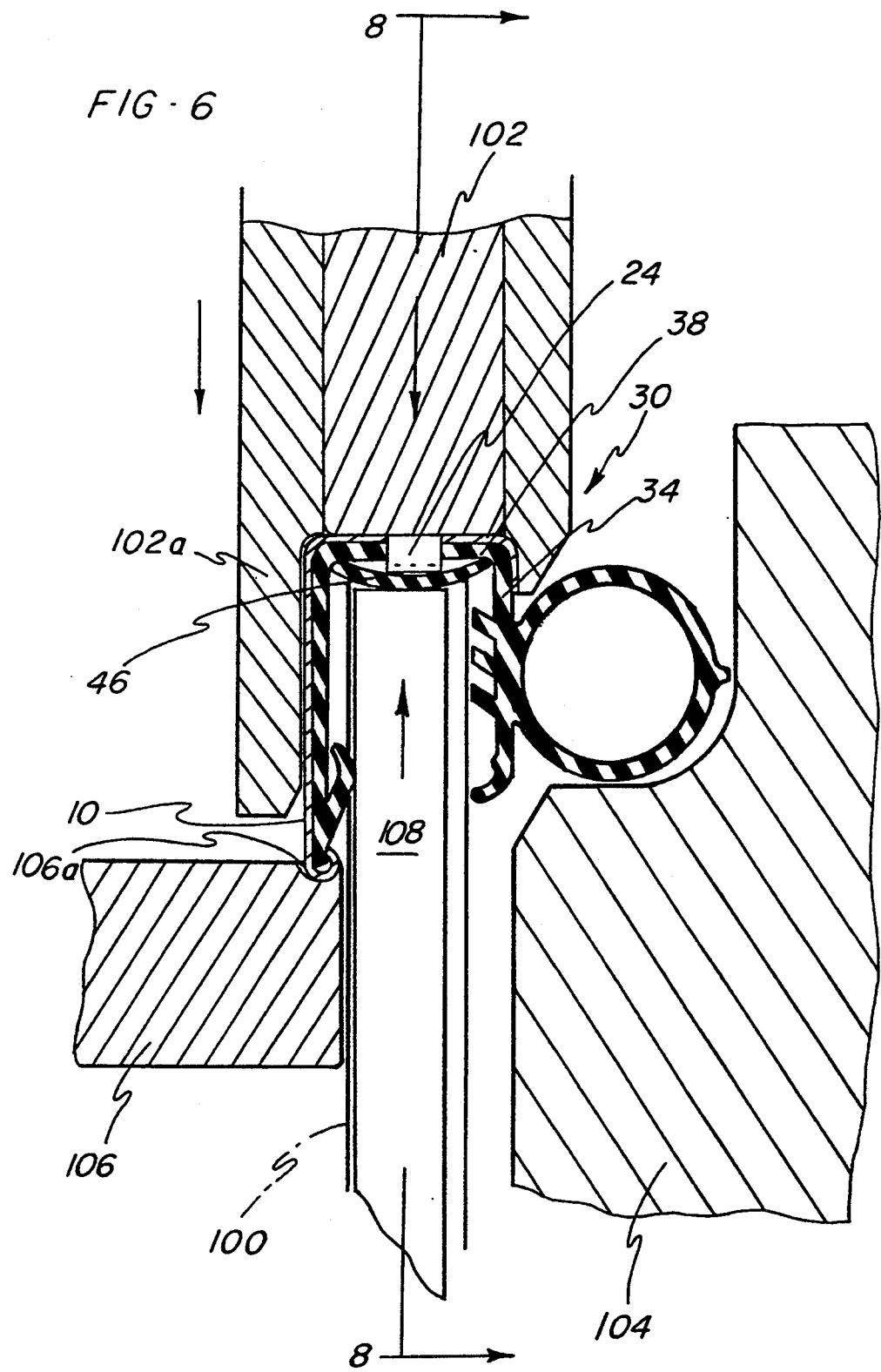
FIG. 6 is a side cross-sectional view of the clip as it is being fastened to the weather stripping.

The present invention utilizes a specially configured clip for joining two ends of weather stripping.

Referring to FIG. 1, the weather stripping clip 10 has a base 12 which is substantially planar and which is provided with a forward margin 14 and a rear margin 16. An upstanding lip 18 is joined to base 12 at the forward margin thereof. The lip 18 is configured for guiding the base 12 during the attachment of the clip to the weather stripping, which will be discussed in mope detail below.

Rear margin 16 of base 12 is joined to a lower margin 21 of an upstanding and generally planar riser 20. The junction 22 between the riser and the base 12 is slightly curved to form against the weather stripping. A ledge 26 is joined to an upper margin 21 of the riser 20 and extends forwardly therefrom. Ledge 26 holds the weather stripping centrally on the riser 20 between the ledge 26 and base 12. A pair of barbs 24 are struck out from riser 20 for piercing a pair of weather stripping ends which have been brought into the clip.

Referring to FIGS. 2, 3 and 4, the clip 10 is attached to two abutting pieces of weather stripping 30. The weather stripping 30 has a uniform cross-section with a generally cylindrical sealing portion 32 and an attachment or joining portion 34. The sealing portion 32 is made of resilient rubber and is preferably hollow.

The attachment portion 34 has a generally planar joining wall 36 attached to the sealing portion 32 so as to be generally tangent thereto. A planar rear wall 38 is attached to the joining wall 36 and extends downwardly away from the sealing portion 32. A bottom wall 40 is attached to the rear wall 38 and extends parallel to the joining wall 36.

The attachment portion 34 may be interiorly reinforced by longitudinally extending wires (not illustrated). The attachment portion may also be reinforced by polyester ply. A plurality of projections 42 extend downwardly from wall 36 inside attachment portion 34. Lips 43 and 44 on the bottom wall 40 and joining wall 36 prevent any water or moisture from entering into the attachment portion 34 during use on a body part of an automobile. A resilient rib 46 is provided on the inside of wall 38 for sealing against an engaging portion of the automobile.

As a first step in the joining process, the two ends of the weather stripping are brought together. Optionally, the sealing portions thereof mat be pulled over a sealing connector 50. The optional sealing connector 50 aids in the attachment of clip 10 to weather stripping 30 and remains in place in the weather stripping when in use. Next, the weather stripping clip 10 is positioned such that the riser 20 is adjacent to rear wall 38 of the attachment portion 34 of the weather stripping and base 12 is adjacent to bottom wall 40 of the attachment portion 34.

The barbs 24 of riser 20 are then forced into rear wall 38. It should be noted that the barbs 24 penetrate wall 38 but do not pierce into or penetrate the resilient rib 46. The barbs 24 hold the two pieces of the weather stripping 30 together in abutting relationship.

Next, the lip 18 of the base 12 is curled around wall 40 and against lip 43 thereof. This curling insures that the base 12 is positioned against the wall 40 of the attachment portion 34 of the weather stripping 30. Next, the ledge 26 is pressed against joining wall 36. This insures a snug fit of the clip 10 around the attachment portion of the weather stripping 30.

After the clip 10 has been appropriately positioned on the attachment portion 34, the barbs 24 are bent toward each other and against wall 38 so as to hold the two ends of the weather stripping tightly together.

Referring now to FIGS. 5, 6, 7, and 8 the clip attachment process will be described in detail from a mechanical point of view. The figures illustrate portions of an installation tool in cross-section. Looking first at FIGS. 5 and 7, the two ends of attachment portion 34 are placed onto a holding bar 100 so as to abut at a point above a middle support 100a. Holding bar 100 supports the weather stripping for attachment of the clip 10 thereto.

Clip 10 is initially positioned in a top press 102. The top press 102 preferably has a magnet embedded therein for releasibly retaining clip 10 during the attachment process. For this purpose clip 10 is preferably fabricated from a ferrous material.

The top press 102, with clip 10 thereon, is pressed downwardly against rear wall 38 of the attachment portion 34. The pressing of clip 10 against the attachment portion 34 forces barbs 24 through the abutting ends of rear wall 38 and positions riser 20 against the exposed surface thereof. Meanwhile, the abutting ends of rib 46 bulge downwardly away from barbs 24. While barbs 24 are long enough to pierce rear wall 38, they do not have sufficient length for piercing the downwardly bulging rib ends. Holding bar 100 and middle support 100a are positioned for supporting the attachment portion 34 during the penetration of the barbs 24 through the rear wall 38.

During the time that the barbs 24 are being forced through the rear wall 38, the lip 18 of the base 12 is inwardly bent and curled around wall 40 and against lip 43 by the curved wall 106a of press 106. Also, the ledge 26 is pressed against joining wall 36, thereby forming the clip 10 around the attachment portion 34.

Figure 7:
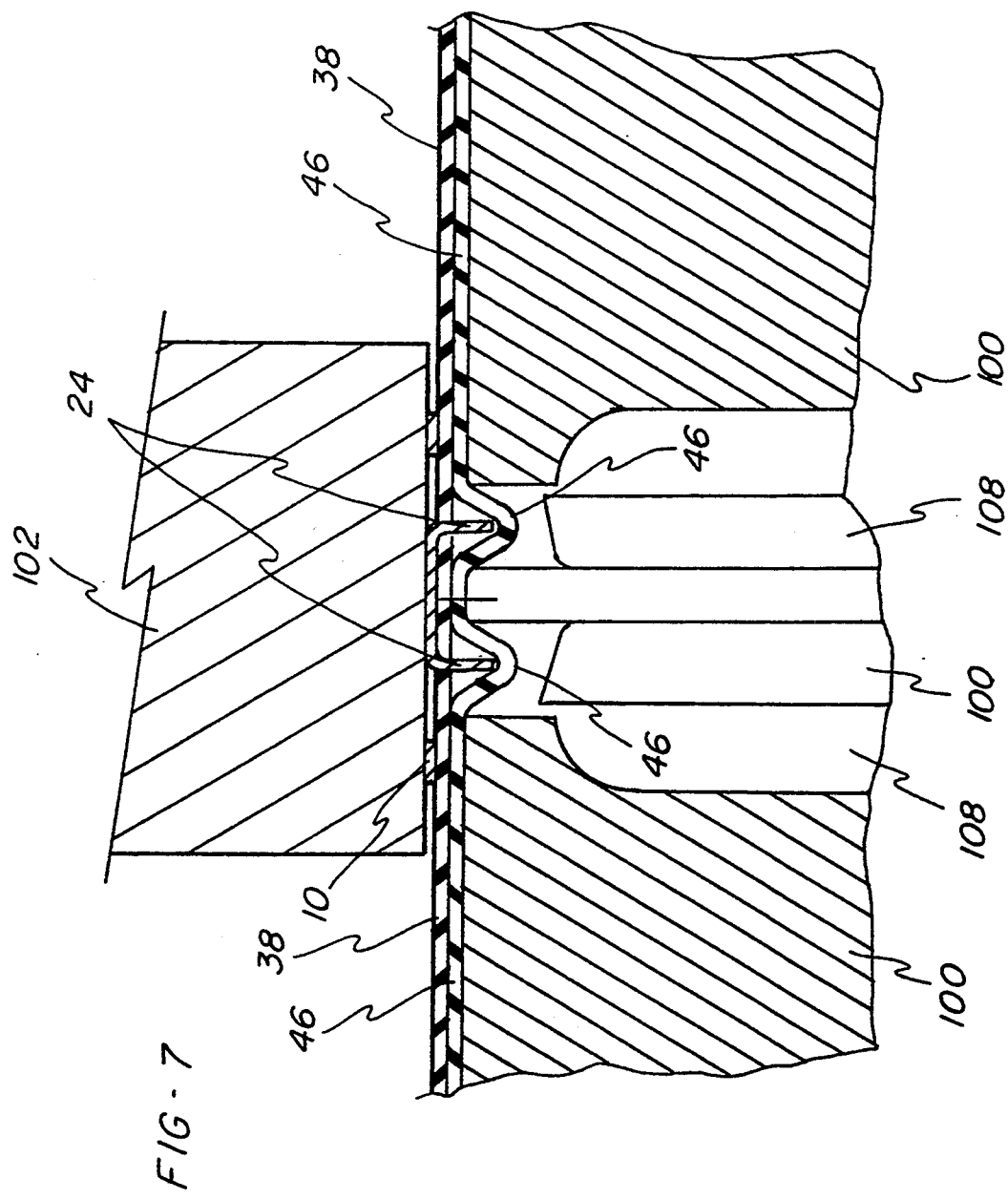
FIG. 7 is a front cross-sectional view of the clip as it is being fastened to the weather stripping.
Figure 8:
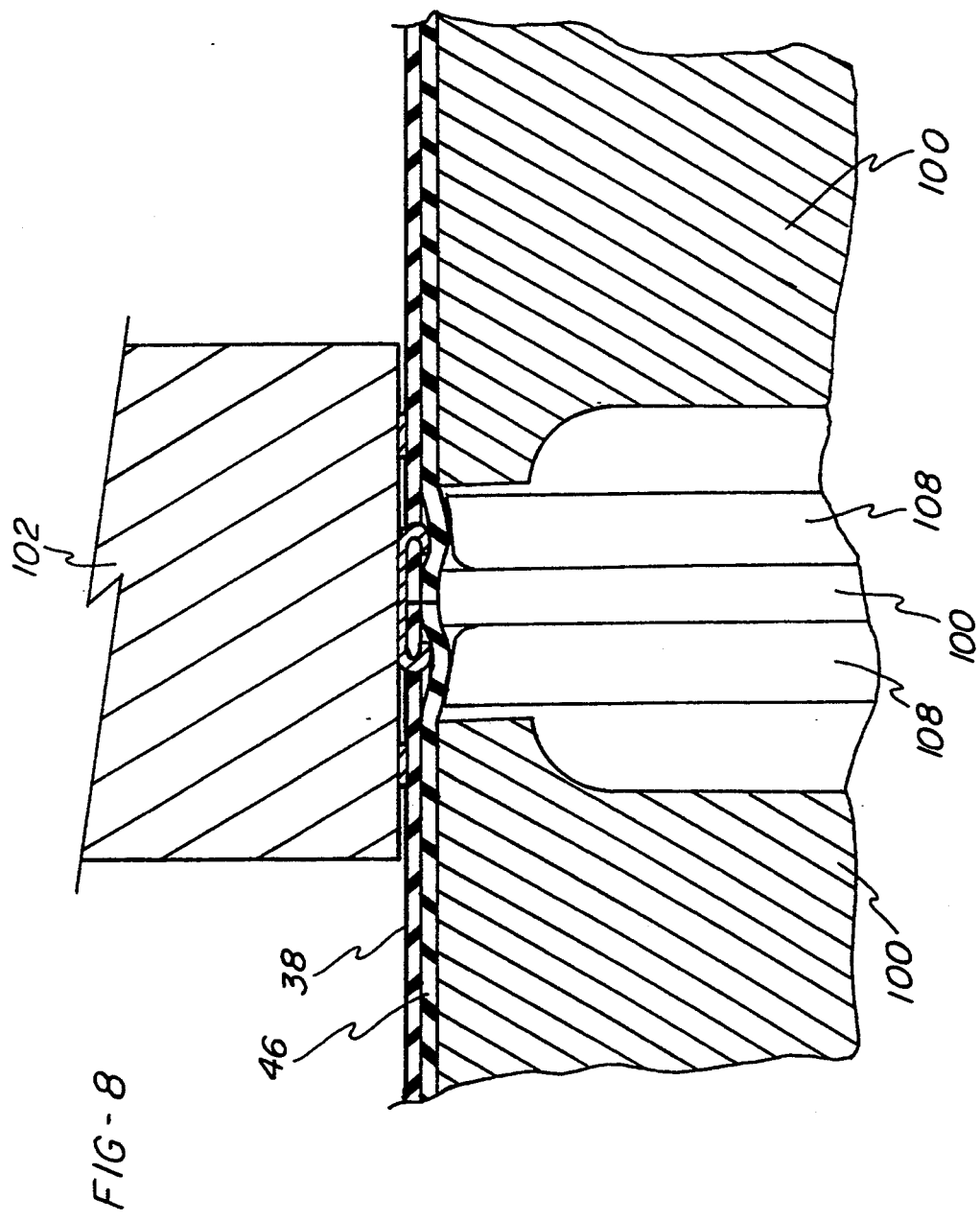
FIG. 8 is a front cross-sectional view of the clip as the barbs are being fastened to the weather stripping.

A bottom press 108 straddles middle support 100a, as illustrated in FIGS. 7 and 8. As shown in those figures, bottom press 108 has a pair of angled faces for engaging rib 46. When top press 102 has reached the lower end of its stroke, bottom press 108 is forced upward against rib 46 thereby bending barbs 24 toward each other and in mutually facing relationship against rear wall 38. As stated above, the barbs do not penetrate the resilient rib 46. The bending of barbs 24 toward each other locks the two ends of the weather stripping 30 together in abutting relationship inside clip 10.

After the barbs 24 are bent against the rear wall 38 the bottom press 108 retracts along with the top press 102 and the weather stripping is removed from the holding bar 100. The final product is a endless loop of weather stripping for use on an automobile.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method of joining two ends of weather stripping; said weather stripping comprising a sealing portion and an attachment portion joined to said sealing portion; said attachment portion comprising a rear wall and a resilient rib sealed against said rear wall and bulging away therefrom; said method comprising the steps of:

positioning said ends together in abutting relationship to define a joint;

placing a clip exteriorly adjacent said rear wall in a position spanning said joint, said clip comprising a riser and a pair of barbs struck out from said riser, said clip being oriented with said riser parallel to said rear wall and said barbs facing opposite ones of said ends;

forcing said clip against said attachment portion such that said barbs penetrate said opposite ones of said ends without penetrating said rib and said riser is pressed against abutting portions of said rear wall; and crimping said barbs in mutually facing relationship interiorly against said rear wall by applying angularly directed faces against said rib.

2. A method according to claim 1 further comprising the step of bending said clip exteriorly about said attachment portion.

3. The method according to claim 2 further comprising the step of;

positioning a sealing connector inside said sealing portion and spanning said joint.

* * * * *